United States Patent Office 2,792,868
Patented May 21, 1957

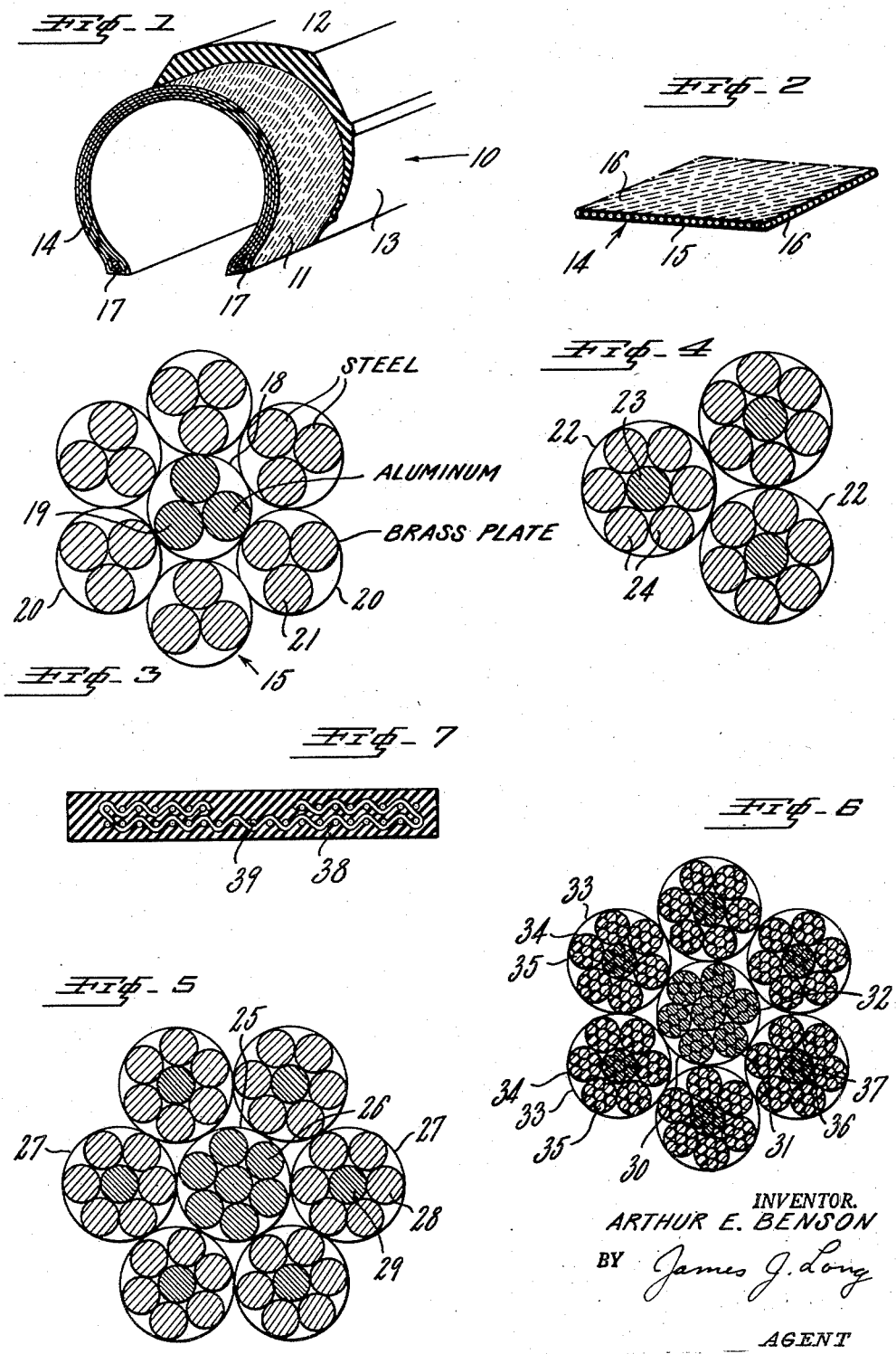

---

2,792,868

REINFORCED RUBBER ARTICLE

Arthur E. Benson, Grosse Pointe Farms, Mich., assignor to United States Rubber Company, New York, N. Y., a corporation of New Jersey Application November 21, 1951, Serial No. 257,616

9 Claims. (Cl. 152—357)

---

This invention relates to improved reinforced rubber articles and more particularly it relates to a filamentary reinforcing material for such rubber articles as tires and conveyor belts in the form of cables comprising wires of ferrous metal twisted around a core of aluminum wire.

One object of the invention is to provide metallic filamentary structures for reinforcing tires and other rubber articles, which are not readily susceptible to fatigue failure.

Another object is the provision of a metallic tire reinforcement which has adequate adhesion to the rubber stock comprising the tire.

Still another object is to provide reinforcement for tires or conveyor belts which is not unduly subject to corrosion.

A further object of the invention is the provision of a pneumatic tire which does not accumulate excessive heat in operation.

Still a further object is to provide a reinforced rubber article embodying strong reinforcing material which is simple to manufacture, and light in weight.

The manner in which the invention accomplishes the foregoing objects, as well as additional objects and advantages, will be made manifest in the following detailed description, which is intended to be read with reference to the accompanying drawings, wherein, Fig. 1 is a fragmentary perspective view, with parts broken away, of a pneumatic tire embodying reinforcing material constructed according to the invention;

Fig. 2 is a fragmentary perspective view of a carcass ply of the tire shown in Fig. 1;

Figs. 3 to 6 are transverse sectional views of various forms of composite metallic cable for reinforcing a tire in accordance with the invention; and, Fig. 7 is a fragmentary perspective view of a conveyor belt reinforced with composite cables of the invention.

The invention provides a reinforced rubber article, such as a tire, in which the filamentary reinforcing material takes the form of metallic elements having an aluminum wire core, about which ferrous wires are twisted. Referring to the drawing, the pneumatic tire 10 shown in Fig. 1 includes a reinforcing carcass 11 over which is disposed a rubber outer covering composed of a tread portion 12 and sidewall portions 13. The carcass 11 is composed of a plurality of superimposed layers or plies 14, each of which consists of a layer of wire fabric made of relatively fine metallic cables 15 laid side by side, and coated on each side with a layer 16 of vulcanizable rubber carcass stock. The end portions of each ply 14 are overlapped around relatively inextensible bead bundles 17, usually made of a plurality of turns of heavier wire. The plies 14 are so arranged in the carcass 11 that the reinforcing cables 15 extend at an angle from bead to bead, across the crown of the tire, alternate plies being so arranged that the cables therein run in opposite directions.

Fig. 3 shows a preferred construction of the reinforcing cables 15 in accordance with the invention. In this form, the cable 15 is composed of a core strand 18 made up of three relatively fine round bare aluminum wires 19 twisted together. About the core 18 there are twisted six other strands 20, each composed of three relatively fine ferrous wires 21, preferably high tensile steel wires, twisted together. All of the wires are of the same diameter.

Another form of reinforcing cable employed in the invention is made up, as shown in Fig. 4, of three similar composite strands 22 twisted together. Each strand 22 is composed of a central round core wire 23 made of aluminum, about which are twisted six surrounding steel wires 24.

Another form of the invention employs a cable, as shown in Fig. 5, having a core strand 25 composed of seven aluminum wires 26 twisted together, such core being surrounded by six outer strands 27, each consisting of six steel wires 28 twisted about a single untwisted aluminum core wire 29.

In the modification of the invention shown in Fig. 6 the core 30 of the reinforcing cable is made up of seven aluminum strands 31, each consisting of seven round bare aluminum wires 32. The core 30 is surrounded by six twisted strands 33, each of which is made up of seven assemblies, each containing in turn seven wires. Each of the strands 33 is composed of six outer assemblies 34 of seven steel wires 35, surrounding a core 36 of seven aluminum wires 37.

The various forms of reinforcing cable, such as the cable 15, are plated at least on their exterior with brass to improve the adhesion of the cable to rubber. Preferably, all of the ferrous wires comprising the cable are brass plated, and such brass plating is most advantageously applied prior to manufacture of the cable and before finally drawing the wires to size.

One advantage of pneumatic tires reinforced with the composite cables described is that the aluminum core provided in the cable is relatively unsusceptible to corrosive fatigue failure. It has been observed that wire tire cables having steel cores are sometimes subject to failure from fatigue. Such fatigue is occasioned largely by corrosive pitting of the surfaces of the steel core of the cable, due to the fact that the steel core is in an environment where corrosion is apt to take place, particularly if small amounts of moisture gain entrance to the interior of the tire carcass. The corrosive pits in the surface of the steel core serve as points of localized stress as the wires are continually flexed during the normal operating deflection of the tire. This condition leads to eventual breakage of the steel core filaments, thus reducing the strength of the cable. Ultimately, the whole cable will break down, causing premature failure of the tire. The invention substantially alleviates this difficulty by providing a construction embodying corrosion resistant core wires of aluminum, which minimizes the type of failure described under the operating conditions prevailing within a pneumatic tire carcass.

This is a particularly advantageous feature of the invention in that it permits the use in pneumatic tires, with good results, of cored strand constructions of cable which have heretofore not been considered entirely desirable. By permitting core constructions to be used effectively, the invention provides considerable convenience and economy, since cored stranded cable constructions adapt themselves to rapid and efficient manufacture, because the core serves as a foundation for the cable, around which outer strands can be laid with precision and compactness. The metallic cored construction also provides a desirably strong cable.

Another advantage of pneumatic tires reinforced with the composite cables described is that the round aluminum wire core provided in the cables in accordance with the invention greatly increases the thermal conductivity of the assembly and provides for a continual flow along the metallic cables of heat generated within the carcass. The thermal conductivity of aluminum is three to four times greater than that of steel. In this way, heat generated at a given point within the carcass is distributed along the length of the metallic cable reinforcement, and is thereby effectively transferred to the thinner sidewall regions of the tire, where there is greater opportunity for loss of heat by radiation, and more especially the heat is conducted along the reinforcing cables to the bead bundles 17, which are in close proximity to the rim or wheel structure on which the tire is mounted. Excess heat thereby readily flows from the bead bundles 17 into the rim and wheel structure from which it is rapidly dissipated.

The composite reinforcement employed in the invention composed of an aluminum wire core, with steel or similar ferrous wires cabled about such core, has the further advantage that it results in an exceptionally lightweight tire, compared to conventional tires of similar strength.

By providing the aluminum in the form of a core in accordance with the invention, such core either representing the core member of the cable as a whole, or the core member of various outer strands of the cable, there is no necessity for specially treating the aluminum to improve its adhesion to the rubber carcass stock, since the rubber stock does not ordinarily have access to the aluminum to any great extent. Therefore, the aluminum core may utilize ordinary unplated and uncoated aluminum wire. This is a significant advantage of the invention because the adhesion of aluminum to rubber is ordinarily extremely poor, and any rubber carcass stock in contact with aluminum would tend to break loose readily therefrom in use, resulting in relative motion between the rubber and the surface of the aluminum as the tire deflects, with consequent abrasive disintegration of the rubber around the cable. The aluminum core constructions avoid this difficulty because the aluminum is essentially surrounded by ferrous wire or strands. There is no great difficulty connected with brass plating the ferrous wires to make them adhere to the rubber, whereas similar brass plating of aluminum to make it adhere to rubber would be relatively cumbersome and would require special additional operations.

Although various coating compositions have been proposed heretofore to improve the adhesion of metals to rubber, practical experience has indicated that these are in general unsatisfactory for usage in the carcass of a pneumatic tire, and early adhesion failures are almost invariably encountered with their use. With the present invention this difficulty is avoided, because the brass plated ferrous wires provide adequate adhesion, and the aluminum core itself need have no direct contact with the rubber stock, so that it is therefore unnecessary to coat the aluminum.

While the reinforcing material of the invention has been described with particular reference to embodiment in a pneumatic tire carcass, it will be understood that the improved reinforcing cables may be employed to advantage in various other forms of resilient and flexible vehicle supports, such as solid rubber flexible belts to be used as tracks for track-laying vehicles, as well as in other mechanical rubber goods, such as conveyor belts. Thus, Fig. 7 shows a flexible rubber belt 38, such as a conveyor belt or track, having embedded in its interior a plurality of layers of reinforcing cables 39, constructed with aluminum cores in accordance with the invention. As a result of the corrosion resistance and high heat conductivity of the aluminum cores of the cables 39, which may be constructed as indicated in Figs. 3 to 6, increased service life is obtainable, compared to conventional constructions. The belt 38 may be manufactured in accordance with the conventional procedures for making such belts.

Having thus described my invention, what I claim and desire to protect by Letters Patent is:

1. A tire ply material comprising a wire fabric of reinforcing cables comprising twisted strands having an aluminum wire core surrounded by steel wires, said steel wires forming the outermost surface of the cables, said fabric being coated on each side with rubber stock.

2. A pneumatic tire comprising rubber tread and sidewall portions and an underlying carcass of rubber reinforced with a fabric of wire cables, said cables being composed of aluminum core wires around which steel wires are twisted, said steel wires forming the outermost surface of said cables, said steel wires being brass plated at least on the exterior surface of the cable.

3. A tire ply material comprising a wire fabric of reinforcing cables composed of a core strand formed of a plurality of bare aluminum wires twisted together, said core strand being surrounded by strands having steel wires on their exterior surfaces, said steel wires being brass plated and forming the outermost surface of said cables, said fabric being coated on each side with rubber stock.

4. A tire ply material comprising a wire fabric of reinforcing cables composed of a core strand formed of a plurality of bare aluminum wires twisted together, said core strand being surrounded by strands made up of a bare aluminum wire core around which steel wires are twisted, said steel wires forming the outermost surface of said cables and being brass plated at least on the exterior surface of the cable, and said fabric being coated with rubber stock.

5. A tire ply material comprising a wire fabric of reinforcing cables composed of a plurality of strands cabled together, each strand having a core of bare aluminum wire about which steel wires are twisted, said steel wires forming the outermost surface of said cables and being brass plated, and said fabric being coated with rubber stock.

6. A pneumatic tire comprising rubber tread and sidewall portions and an underlying carcass comprising a plurality of plies of rubberized wire fabric, the ends of said plies being wrapped around inextensible bead assemblies, said wire fabric being composed of parallel cables, arranged in a diagonal path from bead to bead across the crown of the tire, the cables in alternate plies running in opposite directions, and the said cables being made up of outer strands consisting of steel wires twisted together, said outer strands being laid around a central aluminum core consisting of bare aluminum wires twisted together, said steel wires forming the outermost surface of said cables.

7. A pneumatic tire comprising rubber tread and sidewall portions and an underlying carcass comprising a plurality of plies of rubberized wire fabric, the ends of said plies being wrapped around inextensible bead assemblies, said wire fabric being composed of parallel cables, arranged in a diagonal path from bead to bead across the crown of the tire, the cables in alternate plies running in opposite directions, and the said cables being made up of a plurality of strands cabled together, each strand consisting of a central bare aluminum wire about which steel wires are twisted, said steel wires forming the outermost surface of the cables.

8. A pneumatic tire comprising rubber tread and sidewall portions and an underlying carcass comprising a plurality of plies of rubberized wire fabric, the ends of said plies being wrapped around inextensible bead assemblies, said wire fabric being composed of parallel cables, arranged in a diagonal path from bead to bead across the crown of the tire, the cables in alternate plies running in opposite directions, and the said cables being made up of a core strand consisting of a plurality of bare aluminum wires twisted together, said core strand being surrounded by outer strands consisting of a central bare aluminum core wire about which steel wires are twisted, said steel wires forming the outermost surface of the cables.

9. A pneumatic tire comprising rubber tread and sidewall portions and an underlying carcass comprising a plurality of plies of rubberized wire fabric, the ends of said plies being wrapped around inextensible bead assemblies, said wire fabric being composed of parallel cables, arranged in a diagonal path from bead to bead across the crown of the tire, the cables in alternate plies running in opposite directions, and the said cables being made up of a core strand consisting of a plurality of smaller strands made up of bare aluminum wires twisted together, said core strand being surrounded by outer strands laid around said core strand, each of said outer strands consisting of a central core strand made up of a plurality of bare aluminum wires twisted together, said last mentioned core strand having twisted there around a plurality of strands composed of steel wires twisted together, said steel wires forming the outermost surface of said cables.

References Cited in the file of this patent

UNITED STATES PATENTS

| | | |
|---|---|---|
| 556,663 | Dennison | Mar. 17, 1896 |
| 589,434 | Hooper | Sept. 7, 1897 |
| 1,691,869 | Fowle | Nov. 13, 1928 |
| 1,904,116 | Baum | Apr. 18, 1933 |
| 2,084,784 | Stahl | June 22, 1937 |
| 2,114,517 | Apel et al. | Apr. 19, 1938 |
| 2,167,098 | Wells | July 25, 1939 |
| 2,277,145 | Pierce | Mar. 24, 1942 |
| 2,396,734 | Williams | Mar. 19, 1946 |
| 2,423,995 | Reynolds | July 15, 1947 |
| 2,425,575 | Suloff | Aug. 12, 1947 |
| 2,563,113 | Hindin | Aug. 7, 1951 |

FOREIGN PATENTS

| | | |
|---|---|---|
| 335,357 | France | Jan. 22, 1904 |
| 344,194 | Great Britain | Mar. 5, 1931 |